US010672236B1

(12) United States Patent
Tseng

(10) Patent No.: US 10,672,236 B1
(45) Date of Patent: Jun. 2, 2020

(54) INTELLIGENT POS MACHINE

(71) Applicant: GRACE UNION TECHNOLOGY LIMITED, Tsuen Wan NT (HK)

(72) Inventor: Shao-Chin Tseng, Tsuen Wan NT (HK)

( * ) Notice: Subject to any disclaimer, the term of this patent is extended or adjusted under 35 U.S.C. 154(b) by 0 days.

(21) Appl. No.: 16/257,900

(22) Filed: Jan. 25, 2019

(51) Int. Cl.
*G06K 15/00* (2006.01)
*G07G 1/12* (2006.01)
*G07F 7/08* (2006.01)
*G06Q 20/34* (2012.01)
*G07G 1/00* (2006.01)

(52) U.S. Cl.
CPC .............. *G07G 1/12* (2013.01); *G06Q 20/353* (2013.01); *G07F 7/0886* (2013.01); *G07G 1/0018* (2013.01)

(58) Field of Classification Search
CPC ....... G06Q 30/06; G06Q 20/20; G07G 1/0054
USPC ......................................................... 235/383
See application file for complete search history.

(56) References Cited

U.S. PATENT DOCUMENTS

| 8,561,884 B2 * | 10/2013 | Jimenez Alamo ... | G09B 21/006 235/375 |
| 9,607,181 B2 * | 3/2017 | Matsumoto ............. | G06F 21/74 |
| 2004/0060982 A1 * | 4/2004 | Zenou .................. | G06K 7/0004 235/383 |
| 2013/0299574 A1 * | 11/2013 | Theobald ............... | G06Q 20/34 235/380 |
| 2015/0161601 A1 * | 6/2015 | Matsumoto .......... | G06Q 20/353 705/17 |

* cited by examiner

*Primary Examiner* — Ahshik Kim
(74) *Attorney, Agent, or Firm* — HYIP

(57) ABSTRACT

The invention relates to an intelligent POS machine. The intelligent POS machine comprises a housing, a card reading module, a turning plate, and a rear work module; the housing is internally provided with an embedding groove; the card reading module is located in the embedding groove; the rear work module is installed on the turning plate; the turning plate is hinged on an inside wall of the embedding groove and located above the card reading module; the housing is internally provided with a control board; the card reading module is connected with the control board, and the rear work module is connected with the control board through an FPC board. In this way, the whole exterior of the POS machine is more integrated and more elegant.

7 Claims, 3 Drawing Sheets

INTELLIGENT POS MACHINE

BACKGROUND OF THE INVENTION

1. Technical Field

The invention relates to the technical field of financial settlement products, and in particular to an intelligent POS machine.

2. Description of Related Art

It is well-known that a POS machine is a multi-functional machine. Once installed at specially engaged commercial units and accepting sites of credit cards and networked with computers, the POS machine can be used to implement automatic electronic fund transfers. The POS machine has the functions of supporting consumption, performing pre-authorization, inquiring about balance, and transferring money. The POS machine is safe, quick and reliable in use. It is difficult to obtain the basic operation information in block transactions. The main purpose of importing the POS system is to solve the information management blind point of the retail industry. This is an important constituent part of the chained store management information system.

However, payment means have become diversified along with the continuous development of science and technology. In the whole world, mobile pay has become the mainstream payment means. Scanning the payment code can quickly complete payment. To scan a payment code, a camera is required to read the payment code. Existing POS machines are integrated with a camera, but a card reading module and the camera usually conflict in the aspect of structure. The structural conflict is reflected in that the camera and the card reading module are installed on the housing in parallel, thus greatly increasing the overall width. Besides, the camera is not positioned in the center, which is not in conformity with the conventional recognition on and use of the camera by users. In order to solve this problem, the camera and the card reading module are installed on the housing in a cascading way. However, the cascading installation approach greatly increases the thickness of a product, and brings inconvenience in wiring between the camera and the card reading module.

BRIEF SUMMARY OF THE INVENTION

Aiming at the defects in the prior art, the objective of the invention is to provide an embedding-type intelligent POS machine.

To achieve the above objective, the invention adopts the following technical solution:

An intelligent POS machine includes a housing, a card reading module, a turning plate and a rear work module; the housing is internally provided with an embedding groove; the card reading module is located in the embedding groove; the rear work module is installed on the turning plate; the turning plate is hinged on an inside wall of the embedding groove and located above the card reading module; the housing is internally provided with a control hoard; the card reading module is connected with the control board, and the rear work module is connected with the control board through an flexible printed circuit (FPC), or a data cable.

Preferably, the housing is provided with a charging plug, and the control board is provided with a charging battery.

Preferably, a card reading slot is formed at a position, located at the card reading module, of the housing.

Preferably, the housing is provided with a touch panel and a control key, and the touch panel and the control key are both connected with the control board.

Preferably, the housing is also provided with a speaker, and the speaker is connected with the control board.

Preferably, a rear cover is fastened at a position, located at the embedding groove, of the housing, and a preformed hole is formed at a position, located at the rear work module, of the rear cover.

Preferably, a front camera is arranged on a face, opposite to the rear work module, of the housing, and the front camera is connected with the control board.

By adopting the above solution, the card reading module and the rear work module in this invention are installed in a cascaded way, and then the rear work module can be designed in the center. At the same time, the housing is formed with the embedding groove in which the card reading module and the rear work module can be accommodated, thus greatly reducing the thickness, and effectively protecting the card reading module and the rear work module. Thus, the whole exterior of the POS machine is more integrated and more elegant. Moreover, the card reading module and the rear work module are isolated by the turning plate and the FPC or the data cable realizes the signal transmission of the rear work module at the turning point of the turning plate, solving the difficulty in signal transmission at the turning point. The invention has a simple structure, is convenient to operate, and highly practical.

and

Figure 3:
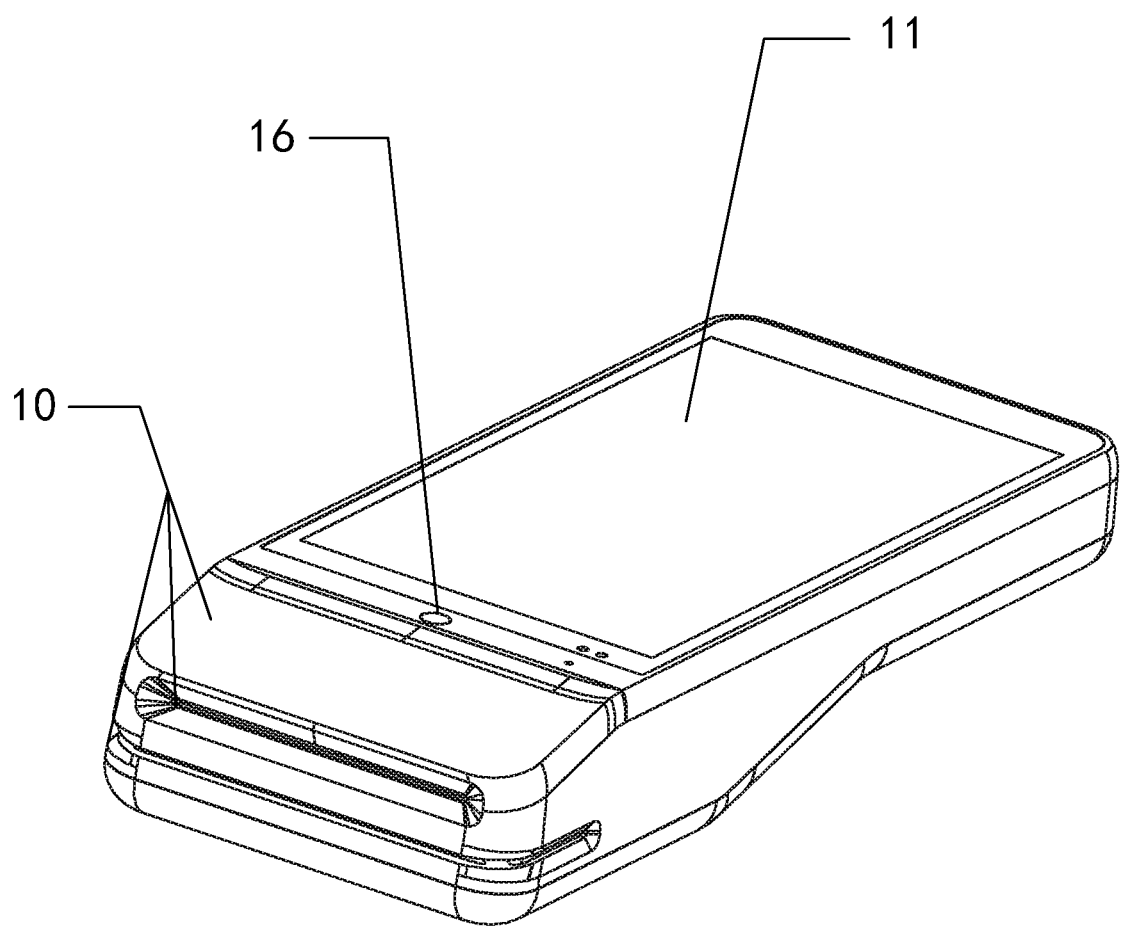

FIG. 3 is a structural view of a front of the embodiment of the invention.

DETAILED DESCRIPTION OF THE INVENTION

The embodiment of the invention is described in detail in conjunction with the attached drawings. However, the invention may have a plurality of different embodiments according to the claims.

Figure 1:
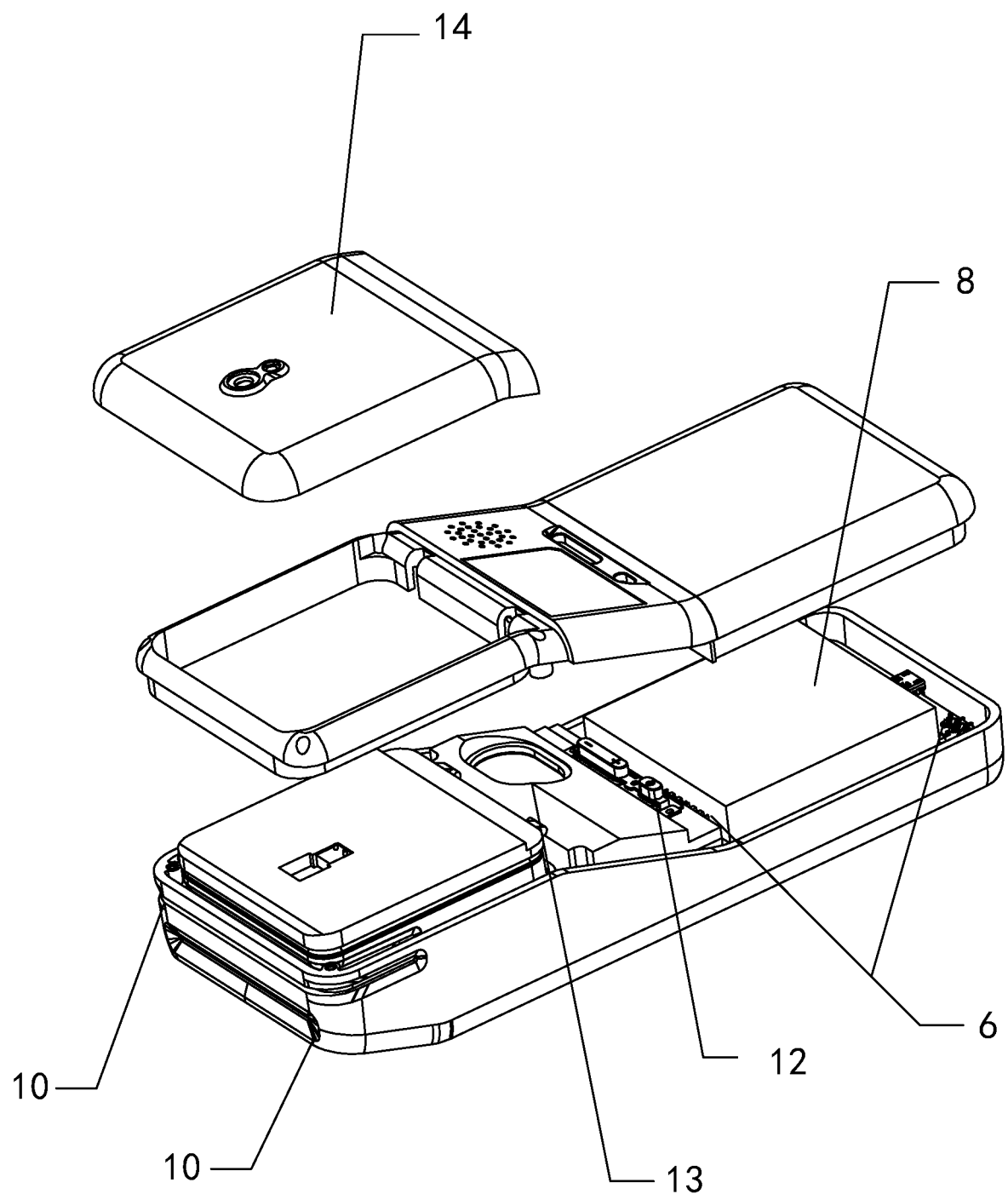
FIG. 1 is a schematic diagram of an embodiment of the invention.
Figure 2:
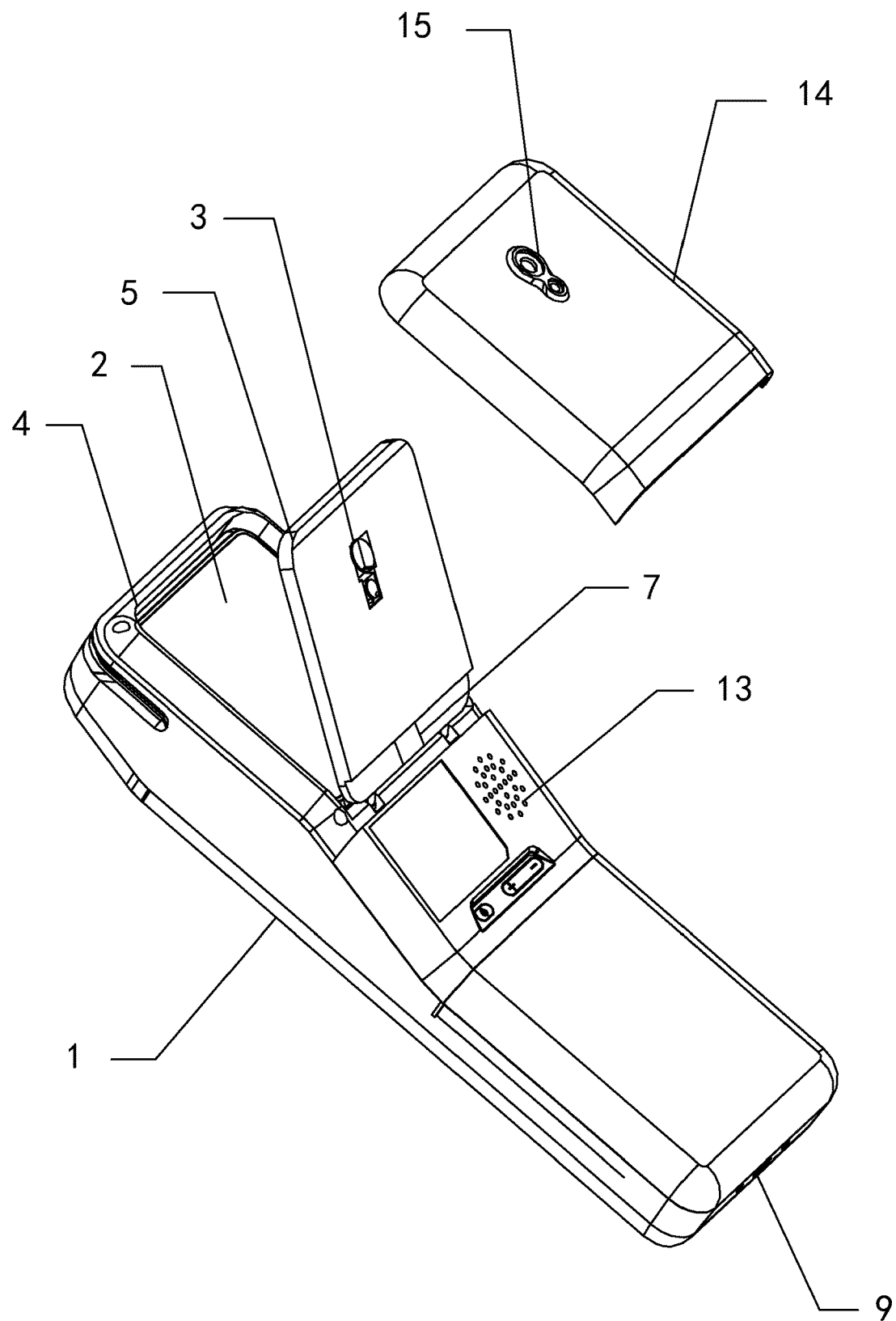
FIG. 2 is a structural view of a back of the embodiment of the invention.

As shown in FIG. 1-FIG. 3, the embodiment provides an intelligent POS machine which includes a housing 1, a card reading module 2, a turning plate 5 and a rear work module 3. The housing 1 is provided with an embedding groove 4; the card reading module 2 is positioned in the embedding groove 4; the rear work module 3 is installed on the turning plate 5; the turning plate 5 is hinged on the inside wall of the embedding groove 4 and located above the card reading module 2; the housing 1 is internally provided with a control board 6; the card reading module 2 is connected with the control board 6; and the rear work module 3 is connected with the control board 6 through an flexible printed circuit (FPC) 7.

In this embodiment, the card reading module 2 and the rear work module 3 are installed in a cascaded way, and then the rear work module 3 can be designed on the back of the reading module, consistent with the conventional recognition and use of the rear work module 3, for example, a rear camera, by users. At the same time, the housing 1 is formed with the embedded groove 4; the card reading module 2 and the rear work module 3 can be accommodated in the embedding groove 4, thus greatly reducing the thickness, and effectively protecting the card reading module 2 and the rear work module 3. Thus, the whole exterior of the POS machine is more integrated and more elegant. Moreover, the card reading module 2 and the rear work module 3 are isolated by the turning plate 5 and the FPC 7 or the data cable realizes the signal transmission of the rear work module 3 at the turning point of the turning plate 5, and further reducing the internal space.

Further, in order to prolong the cruising ability, the control board 6 in this embodiment is provided with a charging battery 8; the housing 1 is provided with a charging plug 9; and the charging plug 9 may be a power adapter such as a charging contact or a USB chargeable plug.

Further, the card reading module plays a main function of realizing IC, magnetic strip and NFC induction or reads a card in any contact or non-contact way; in order to conveniently read the card, a card reading slot 10 is formed at a position, located at the card reading module 2, of the housing 1, and the card reading slot 10 is card slot or a non-contact sensing terminal.

Further, in order to facilitate checking information during operation, in this embodiment, the housing 1 is provided with a touch panel 11 and a control key 12, and the touch panel 11 and the control key 12 are both connected with the control board 6. The touch panel 11 facilitates the operation of the user, and the control key 12 can be used to turn on or off the machine.

Further, in order to give a real-time voice prompt, in this embodiment, the housing 1 is also provided with a speaker 13; the speaker 13 is connected with the control board 6; and the volume of the speaker 13 can be controlled trough the control key 6.

Further, in order to integrate the overall exterior of the POS machine, in this embodiment, a rear cover 14 is fastened at a position, located at the embedding groove 4, of the housing 1, and a preformed hole 15 is formed at a position, located at the rear work module 3, of the rear cover 14. The rear cover 14 performs covering such that the POS machine is integrated and that foreign matter is prevented from entering the embedding groove 4.

Further, to facilitate code scanning, in this embodiment, a front camera 16 is arranged on a face, opposite to the rear work module 3, of the housing 1, and the front camera 16 is connected with the control board 6.

The above are preferred embodiments of the invention and cannot be regarded as limiting the patent scope of the invention. All equivalent structures or equivalent flow modifications made on the basis of the description and drawing contents of the invention, or direct or indirect application in other relevant technical fields shall fall within the scope of patent protection of the invention.

What is claimed is:

1. An intelligent PUS machine, comprising a housing, a card reading module, a turning plate and a rear work module, wherein the housing is internally provided with an embedding groove; the card reading module is located in the embedding groove; the rear work module is installed on the turning plate; the turning plate is hinged on an inside wall of the embedding groove and located above the card reading module; the housing is internally provided with a control board; the card reading module is connected with the control board, and the rear work module is connected with the control board through an flexible printed circuit (FPC) or a data cable.

2. The intelligent PUS machine according to claim 1, wherein the housing is provided with a charging plug, and the control board is provided with a charging battery.

3. The intelligent PUS machine according to claim 1, wherein a card reading slot is formed at a position, located at the card reading module, of the housing.

4. The intelligent POS machine according to claim 1, wherein the housing is provided with a touch panel and a control key, and the touch panel and the control key are both connected to the control board.

5. The intelligent PUS machine according to claim 1, wherein the housing is also provided with a speaker, and the speaker is connected with the control board.

6. The intelligent POS machine according to claim 1, wherein a rear cover is fastened at a position, located at the embedding groove, of the housing, and a preformed hole is formed at a position, located at the rear work module, of the rear cover.

7. The intelligent PUS machine according to claim 1, wherein a front camera is arranged on a face, opposite to the rear work module, of the housing, and the front camera is connected with the control board.

* * * * *